United States Patent
Okada et al.

(10) Patent No.: US 11,926,767 B2
(45) Date of Patent: Mar. 12, 2024

(54) ADHESIVE COMPOSITION, LAMINATE, AND PACKAGE

(71) Applicant: DIC Corporation, Tokyo (JP)

(72) Inventors: Katsuhiko Okada, Tokyo (JP); Shigekazu Takahashi, Tokyo (JP); Ruiyu Si, Qingdao (CN); Xiao Sun, Qingdao (CN); Zhiqiang Liu, Qingdao (CN)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 17/795,288

(22) PCT Filed: Feb. 12, 2020

(86) PCT No.: PCT/CN2020/074845
§ 371 (c)(1),
(2) Date: Jul. 26, 2022

(87) PCT Pub. No.: WO2021/159300
PCT Pub. Date: Aug. 19, 2021

(65) Prior Publication Data
US 2023/0079465 A1 Mar. 16, 2023

(51) Int. Cl.
*C09J 191/00* (2006.01)
*B32B 7/12* (2006.01)
*B32B 27/08* (2006.01)
*B32B 27/34* (2006.01)

(52) U.S. Cl.
CPC .............. *C09J 191/00* (2013.01); *B32B 7/12* (2013.01); *B32B 27/08* (2013.01); *B32B 27/34* (2013.01); *B32B 2255/10* (2013.01); *B32B 2255/26* (2013.01); *B32B 2255/28* (2013.01); *B32B 2307/31* (2013.01); *B32B 2439/06* (2013.01)

(58) Field of Classification Search
None
See application file for complete search history.

(56) References Cited

U.S. PATENT DOCUMENTS

| 4,561,901 | A | 12/1985 | Schilling |
| 2014/0230689 | A1 | 8/2014 | Houser et al. |

FOREIGN PATENT DOCUMENTS

| CA | 2704147 A1 | * | 1/2009 |
| CN | 2704147 A1 | * | 1/2009 |
| CN | 102225922 A | | 10/2011 |
| CN | 102732200 A | * | 10/2012 |
| CN | 103146205 A | * | 6/2013 |
| JP | H02212580 A | * | 8/1990 |
| JP | H11-504315 A | | 4/1999 |
| JP | 2001-152127 A | | 6/2001 |
| JP | 2007-517965 A | | 7/2007 |
| JP | 5651172 B2 | | 1/2015 |
| JP | 2015-213064 A | | 11/2015 |
| JP | 6512256 B2 | | 5/2019 |
| JP | 2019-171662 A | | 10/2019 |
| JP | 2020-7480 A | | 1/2020 |
| WO | 96/26189 A1 | | 8/1996 |
| WO | 2005/071050 A1 | | 8/2005 |
| WO | 2007/040261 A1 | | 4/2007 |
| WO | 2013/073981 A1 | | 5/2013 |
| WO | 2013/115669 A1 | | 8/2013 |
| WO | 2017/104731 A1 | | 6/2017 |
| WO | 2018/128032 A1 | | 7/2018 |

OTHER PUBLICATIONS

Notice of Allowance dated Oct. 25, 2022, issued in counterpart JP Application No. 2021-520353, with English Translation. (4 pages).
International Search Report dated Nov. 12, 2020, issued in counterpart International Application No. PCT/CN2020/074845 (2 pages).
Notice of Reasons for Rejection dated Mar. 22, 2022, issued in JP Patent Application No. 2021-520353, w/English translation (6 pages).
Extended (Supplementary) European Search Report dated Oct. 6, 2023, issued in counterpart EP Application No. 20918336.7. (6 pages).

* cited by examiner

*Primary Examiner* — Tae H Yoon
(74) *Attorney, Agent, or Firm* — WHDA, LLP

(57) ABSTRACT

An adhesive composition contains an acid anhydride group-containing oil or fat (A) and a curing agent (B) having a reactive group reactive with an acid anhydride group. A laminate is obtained by placing an adhesive layer between a first substrate and a second substrate, and the adhesive layer includes the aforementioned adhesive composition. A package is obtained by forming a bag from a laminate obtained by placing an adhesive layer between a first substrate and a second substrate, and the adhesive layer includes the aforementioned adhesive composition.

12 Claims, No Drawings

ADHESIVE COMPOSITION, LAMINATE, AND PACKAGE

TECHNICAL FIELD

The present invention relates to a two-part adhesive composition, and a laminate and a package obtained by laminating various types of substrates by using this adhesive.

BACKGROUND ART

Multilayer films (also referred to as laminate films) used in various types of packaging materials and labels are given design, functions, preservative quality, convenience, and transportability by being laminated with various plastic films, metal foils, etc., and, in particular, are formed into bags and used as packages for food, pharmaceutical products, detergents, etc. A reactive adhesive (also known as a two-part adhesive) formed by a combination of a polyisocyanate composition and a polyol composition is known as an adhesive for laminating these films.

A reactive adhesive, which is a combination of a polyisocyanate composition and a polyol composition, has many advantages including not only the adhesive strength but also appropriate curing speeds, abundant raw material sources, etc.; however, the reactive adhesive has issues such as difficulty in handling (skin irritation and inhalation toxicity) derived from high reactivity of the isocyanate, and generation of primary aromatic amines, which are carcinogenic, during curing, and the market has been seeking for safer reactive adhesives.

In addition, a reactive adhesive, which is a combination of a polyisocyanate composition and a polyol composition, has an issue of degraded adhesive strength since most of the isocyanate reacts with moisture under the curing condition, in particular, a high-humidity condition, and a cured coating film with sufficient strength cannot be formed. Due to this issue, the blend ratio is set so that the isocyanate is in excess, but increasing the excess ratio causes carbon dioxide gas, which is generated by reactions between isocyanate groups, to remain in the laminate film and causes appearance defects such as pinholes. Such a phenomenon is particularly prominent in a film structure with a high barrier property (for example, a polyethylene terephthalate (PET)/vapor-deposited film structure), and improvement on this issue is strongly desirable.

In order to address this issue, isocyanate-free laminate adhesives, such as a reactive adhesive that uses a combination of an epoxy compound and an amine compound (for example, see PTL 1) and a reactive adhesive that uses a combination of an epoxy compound and a polyurethane polyurea resin having a primary amino group in the molecular structure (for example, see PTL 2), are known; however, some of epoxy compounds are reported to exhibit a mutagenic property, and are considered to pose a risk to safety.

In addition, a curable system containing a carboxyl group and a carbodiimide group has also been proposed (for example, see PTL 3); however, in general, carboxyl group-containing compounds and polycarbodiimide compounds are highly viscous and are difficult to apply as solventless adhesives that are in high demand for barrier film structures. Thus, there are issues in that, for use as a solvent-borne adhesive dissolved in an organic solvent, large quantities of solvents must be used to decrease the viscosity, much energy is needed to remove the solvents, and large quantities of waste solvents are generated. Another issue is that the appearance of the film has poor smoothness.

CITATION LIST

Patent Literature

[PTL 1] Japanese Patent No. 5651172
[PTL 2] Japanese Patent No. 6512256
[PTL 3] WO 2018/128032

SUMMARY OF INVENTION

Technical Problem

An object of the present invention is to provide a reactive adhesive composition that has high safety, adhesive strength comparable to a known reactive adhesive that uses a combination of a polyisocyanate composition and a polyol composition, and excellent laminate appearance, such as excellent smoothness free of coating film defects such as pinholes.

Solution to Problem

The inventors of the present invention have found that an adhesive composition that contains, as essential components, an acid anhydride group-containing oil or fat (A) and a curing agent (B) solves the issues described above.

In other words, the present invention provides an adhesive composition that contains an acid anhydride group-containing oil or fat (A) and a curing agent (B) having a reactive group reactive with an acid anhydride group.

The present invention also provides a laminate obtained by placing an adhesive layer between a first substrate and a second substrate, in which the adhesive layer includes the aforementioned adhesive composition.

The present invention also provides a package obtained by forming a bag from a laminate obtained by placing an adhesive layer between a first substrate and a second substrate, in which the adhesive layer includes the aforementioned adhesive composition.

Advantageous Effects of Invention

The adhesive composition of the present invention has adhesive strength comparable to a known reactive adhesive that uses a combination of a polyisocyanate composition and a polyol composition, and forms a laminate film with excellent appearance free of coating film defects such as pinholes with excellent smoothness. Since the adhesive composition is highly safe, the adhesive composition is suitable for use in food packaging bags.

DESCRIPTION OF EMBODIMENTS (Acid Anhydride Group-Containing Oil or Fat (A))

The oil or fat (A) used in the present invention contains an acid anhydride group.

Fats and oils are esters of fatty acids and glycerin, in other words, substances having triglyceride structures, and are widely present in the natural living world. The acid anhydride group-containing oil or fat (A) used in the present invention preferably has a chemical structure in which an acid anhydride group is introduced to an oil or fat containing a double bond derived from an unsaturated fatty acid.

The oil or fat containing, in its chemical structure, a double bond derived from an unsaturated fatty acid is preferably, for example, a dry oil (iodine value: >130) and/or a semi-dry oil (iodine value: 100-130), and examples of vegetable oils include tung oil, linseed oil, perilla oil, safflower oil, dehydrated castor oil, soybean oil, rapeseed oil, sunflower oil, sesame oil, rice oil, cottonseed oil, corn oil, tall oil, poppy oil, walnut oil, and pine seed oil. Examples of the animal oils include fish oils (sardine oil, saury oil, herring oil, etc.).

In the present invention, reclaimed vegetable oils, such as tempura oil, recovered and reclaimed after used in food can also be used.

Among these oils and fats, tung oil, soybean oil, and linseed oil are highly available and are thus preferable.

The acid anhydride group-containing compound used for the introduction of the acid anhydride group can be a compound having a double bond in the molecule, and examples thereof include maleic anhydride, citraconic anhydride, and tetrahydrophthalic anhydride. Among these, maleic anhydride is preferably used due to its ease of introduction and the reactivity of the acid anhydride group.

Hereinafter, maleic anhydride is used as an example of the acid anhydride group-containing compound.

From the viewpoint of the adhesive strength of the adhesive cured product obtained as a result of the reaction with the curing agent (B), the amount of maleic anhydride to be introduced is preferably 19 to 34 g (0.19 to 0.35 mol) and is more preferably 22 to 29 g (0.22 to 0.30 mol) relative to 100 g of the oil or fat. When the amount of maleic anhydride to be introduced is excessively large, the viscosity increases excessively, and handling ease may be degraded.

The method for introducing maleic anhydride to an oil or fat can be any known common method. For example, when a dry oil is used as the oil or fat, a method that involves performing a Diels-Alder reaction with maleic anhydride at 50 to 150° C. and more preferably at 60 to 120° C. can be applied. When a semi-dry oil is used as the oil or fat, maleic anhydride can be introduced into the oil by a method that involves performing an Alder-Ene reaction at 150 to 250° C. and more preferably at 180 to 220° C.

There can also be used a method that involves performing a reaction using a semi-dry oil until maleic anhydride has reached a particular reaction ratio and then adding a dry oil to induce reaction of the rest of maleic anhydride.

In the aforementioned reaction, a small amount of an organic peroxide may be added or a known common polymerization inhibitor may be added. Examples of the polymerization inhibitor include benzoquinone, hydroquinone, hydroquinone monomethyl, tert-butylhydroquinone, dibutylhydroxytoluene, and 4-tert-butylcatechol. Alternatively, a method that involves blowing air can be employed.

(Curing Agent (B))

The acid anhydride group-containing oil (A) forms an adhesive cured product having sufficient adhesive strength by reacting with a curing agent (B) having a reactive group reactive with an acid anhydride group. A compound that has a functional group that can react with an acid anhydride group can be used as the curing agent (B), and, in particular, compounds having hydroxyl groups are preferable as the curing agent (B).

(Hydroxyl Group-Containing Compound (B0))

A hydroxyl group-containing compound (B0) (may also be referred to as a polyol (B0)) is, for example, preferably a compound having an average of two or more hydroxyl groups in the molecule, and may be, for example, a polymer polyol selected from polyester polyols, polyether polyols, polyurethane polyols, polyether ester polyols, polyester (polyurethane) polyols, polyether(polyurethane) polyols, acrylic polyols, polycarbonate polyols, polyhydroxyl alkanes, castor oil, and mixtures thereof. At least one polyester polyol is preferably used as the hydroxyl group-containing compound since the reactivity of the hydroxyl groups is high and curability can be improved.

Examples of the polyester polyol include polyester polyols obtained by a reaction between a dibasic acid, a dialkyl ester thereof, or a mixture thereof and a glycol or a mixture of glycols, and polyester polyols obtained by ring-opening polymerization of lactones such as polycaprolactone, polyvalerolactone, or poly(β-methyl-γ-valerolactone). Examples of the dibasic acid include terephthalic acid, isophthalic acid, phthalic anhydride, adipic acid, azelaic acid, sebacic acid, and dimer acid (a liquid fatty acid mainly composed of a C36 dibasic acid obtained by dimerization of a C18 unsaturated fatty acid prepared from a vegetable oil-based oil or fat, and further containing a monobasic acid and tribasic acid). Examples of the glycol include ethylene glycol, propylene glycol, diethylene glycol, butylene glycol, neopentyl glycol, 2-methyl-1,3-propanediol, 1,6-hexanediol, 3-methyl-1,5-pentanediol, 3,3'-dimethylolheptane, polyoxyethylene glycol, polyoxypropylene glycol, and polytetramethylene ether glycol.

Examples of the polyether polyol include polyether polyols obtained by polymerization of an oxirane compound, such as ethylene oxide, propylene oxide, butylene oxide, or tetrahydrofuran, with a low-molecular-weight polyol such as water, ethylene glycol, propylene glycol, trimethylolpropane, or glycerin, serving as an initiator. Examples of the polyether ester polyol include polyether ester polyols obtained by a reaction between the polyether polyol described above and a dibasic acid, a dialkyl ester thereof, or a mixture thereof. Examples of the dibasic acid include terephthalic acid, isophthalic acid, phthalic anhydride, adipic acid, azelaic acid, sebacic acid, and a dimer acid.

The polyurethane polyol is preferably a polyol having urethane bonds in a molecule, and an example thereof is a reaction product between an organic polyisocyanate and a polyether polyol having a number-average molecular weight of 200 to 20,000, the reaction product having NCO/OH of less than 1 and more preferably 0.9 or less. Polyisocyanate compounds described below, in particular, diisocyanate compounds, can be used as the organic polyisocyanate.

The polyether(polyurethane) polyol or the polyester(polyurethane) polyol is preferably a reaction product between an organic polyisocyanate and a polyester polyol or a polyether polyol, the reaction product having NCO/OH of less than 1 and more preferably 0.9 or less.

Examples of the polycarbonate polyol include those obtained by a reaction between one glycol or two or more glycols selected from ethylene glycol, propylene glycol, 1,4-butanediol, 1,5-pentanediol, 1,6-hexanediol, 3-methyl-1,5-pentanediol, 1,9-nonanediol, 1,8-nonanediol, neopentyl glycol, diethylene glycol, dipropylene glycol, 1,4-cyclohexanediol, 1,4-cyclohexanedimethanol, bisphenol A, and hydrogenated bisphenol A, and dimethyl carbonate, diphenyl carbonate, ethylene carbonate, or phosgene.

An example of the acrylic polyol is an acrylic polyol obtained by copolymerization between hydroxyethyl acrylate, hydroxypropyl acrylate, or hydroxybutyl acrylate having one or more hydroxyl groups in a molecule or a corresponding methacrylate derivative thereof, and acrylic acid, methacrylic acid, or an ester thereof.

Examples of the polyhydroxy alkane include butadiene and liquid rubber obtained by copolymerization of butadiene and acrylamide or the like.

When the polyester polyol is to be used, a polyester polyol having a number-average molecular weight of 400 to 2000 and a hydroxyl value of 60 to 300 is preferably used.

Moreover, a glycol (diol) such as ethylene glycol, propylene glycol, diethylene glycol, 1,4-butadienediol, or 1,6-hexanediol or a trihydric or tetrahydric alcohol, such as glycerin, trimethylolpropane, or pentaerythritol, can be directly used as part of the curing agent (B).

The hydroxyl group-containing compounds (B0) mentioned above may be used alone or in combination.

(Amine Compound (B1))

In the present invention, the curing agent (B) preferably contains, in addition to the hydroxyl group-containing compound (B0) described above, at least one amine compound (B1). The amine compound (B1) not only serves as a curing agent and contributes to formation of an adhesive cured product but also acts as a catalyst since nitrogen contained in the structure accelerates the reaction between the acid anhydride group and the hydroxyl group, thereby improving the curing rate.

One amine compound or a combination of two or more amine compounds may be used as the amine compound (B1).

The amine compound (B1) is preferably a compound having two or more primary and/or secondary amino groups in a molecule or a compound having one or more tertiary amino groups in a molecule, and examples thereof include a tertiary amine-containing polyol (B2) having multiple hydroxyl groups, amide polyol, and polyamine. In particular, a tertiary amine-containing polyol (B2) is preferable for use since the balance between the reactivity with the acid anhydride group-containing oil or fat (A) and the physical properties of the coating film formed therefrom can be easily adjusted. In addition, an amino alcohol having a primary or secondary amino group and a hydroxyl group in a molecule can also be used. Examples of such an amino alcohol include monomethanolamine, N-methylmethanolamine, N-ethylmethanolamine, dimethanolamine, monoethanolamine, N-methylethanolamine, N-ethylethanolamine, and diethanolamine. A tertiary amine compound having two or more hydroxyl groups is preferable as the tertiary amine-containing polyol (B2), and, particularly preferably, two to six hydroxyl groups are contained. It is sufficient if one or more tertiary amino groups are contained, but preferably one or two tertiary amino groups are contained.

Specific examples thereof include polypropylene glycol ethylene diamine ether, tri(1,2-polypropylene glycol)amine, N-ethyldiethanolamine, N-methyl-N-hydroxyethyl-N-hydroxyethoxyethylamine, pentakishydroxypropyldiethylenetriamine, and tetrakishydroxypropylethylenediamine.

A commercially available product may be used as the tertiary nitrogen-containing polyol (B2). Examples of the commercially available product include TE-360 (tertiary nitrogen-containing trifunctional polyol produced by Kokdo Chemical Co., Ltd. (China)), TD-401 (tertiary nitrogen-containing tetrafunctional polyol produced by Kokdo Chemical Co., Ltd. (China)), and EDP-300 and EDP-450 (tertiary nitrogen-containing tetrafunctional polyols produced by Adeka Corporation).

Examples of the amide polyol include polyester amide polyols, more specifically, polyester amide polyols obtained by additionally using amino group-containing aliphatic diamines, such as ethylenediamine, propylenediamine, and hexamethylenediamine, as raw materials during the esterification reaction of the polyester polyols described above.

The polyamine is not particularly limited, and any known polyamine having primary and/or secondary amino groups can be used. The polyamine may contain a tertiary amine.

Examples of the aliphatic diamines (number of carbon atoms: 2 to 18) include aliphatic diamines such as alkylene (number of carbon atoms: 2 to 6) diamines, e.g., ethylenediamine, propylenediamine, trimethylenediamine, tetramethylenediamine, and hexamethylenediamine, and polyalkylene (number of carbon atoms: 2 to 6) diamines, e.g., diethylenetriamine, iminobispropylamine, bis(hexamethylene)triamine, triethylenetetramine, tetraethylenepentamine, and pentaethylenehexamine;

alkyl (number of carbon atoms: 1 to 4)- or hydroxyalkyl (number of carbon atoms: 2 to 4)-substituted aliphatic diamines, e.g., dialkyl (number of carbon atoms: 1 to 3) aminopropylamine, trimethylhexamethylenediamine, aminoethylethanolamine, 2,5-dimethyl-2,5-hexamethylenediamine, and methyliminobispropylamine;

alicyclic or heterocyclic ring-containing aliphatic diamines such as alicyclic diamines (number of carbon atoms: 4 to 15), e.g., 1,3-diaminocyclohexane, isophoronediamine, mensendiamine, and 4,4'-methylenedicyclohexanediamine (hydrogenated methylenedianiline), and heterocyclic diamines (number of carbon atoms: 4 to 15), e.g., piperazine, N-aminoethylpiperazine, 1,4-diaminoethylpiperazine, and 3,9-bis(3-aminopropyl)-2,4,8,10-tetraoxaspiro[5,5]undecane; and aromatic ring-containing aliphatic amines (number of carbon atoms: 8 to 15), e.g., xylylenediamine and tetrachloro-p-xylylenediamine.

Examples of the aromatic diamines (number of carbon atoms: 6 to 20) include unsubstituted aromatic diamines such as 1,2-, 1,3- or 1,4-phenylenediamine, 2,4'- and 4,4'-diphenylmethanediamine, crude diphenylmethanediamine (polyphenylpolymethylenepolyamine), diaminodiphenylsulfone, benzidine, thiodianiline, 2,6-diaminopyridine, m-aminobenzylamine, triphenylmethane-4,4',4"-triamine, and naphthylenediamine;

nucleus-substituted alkyl group (alkyl group having 1 to 4 carbon atoms such as a methyl group, an ethyl group, a propyl group, and a butyl group)-containing aromatic diamines, e.g., 2,4- or 2,6-tolylenediamine, crude tolylenediamine, diethyltolylenediamine, 4,4'-diamino-3,3'-dimethyldiphenylmethane, 4,4'-bis(o-toluidine), dianisidine, diaminoditolylsulfone, 1,3-dimethyl-2,4-diaminobenzene, 2,3-dimethyl-1,4-diaminonaphthalene, and 4,4'-diamino-3,3'-dimethyldiphenylmethane, and mixtures of isomers thereof at various ratios;

nucleus-substituted electron-withdrawing group (halogen atoms such as fluorine, chlorine, bromine, and iodine; alkoxy groups such as a methoxy group and an ethoxy group; a nitro group; etc.)-containing aromatic diamines, e.g., methylenebis-o-chloroaniline, 4-chloro-o-phenylenediamine, 2-chloro-1,4-phenylenediamine, 3-amino-4-chloroaniline, bromo-1,3-phenylenediamine, 2,5-dichloro-1,4-phenylenediamine, 5-nitro-1,3-phenylenediamine, and 3-dimethoxy-4-aminoaniline;

secondary amino group-containing aromatic diamine (some or all of —NH2 in the above-described aromatic diamines are substituted with —NH—R' (where R' represents an alkyl group, for example, a lower alkyl group such as a methyl group or an ethyl group)), e.g., 4,4'-di(methylamino)diphenylmethane and 1-methyl-2-methylamino-4-aminobenzene;

low-molecular-weight polyamide polyamines obtained by condensation between dicarboxylic acid (dimer acid or the like) and excess (2 mol or more per mole of the acid) polyamines (such as alkylene diamines and polyalkylene polyamines described above); and polyether polyamines, e.g., cyanoethylated and hydrogenated polyether polyols (such as polyalkylene glycol).

Among the above-described polyamines, polyamide amines and polyether polyamines are preferably used since coating films with excellent strength can be formed.

Commercially available products can be used as the polyamines. Examples of the commercially available products include JEFFAMINE T-403, JEFFAMINE D-230, and JEFFAMINE D-400 (all polyether polyamines produced by Huntsman Corporation (USA)).

When a polyether polyamine is used, the polyether polyamine is preferably difunctional or trifunctional, and the molecular weight thereof is preferably 200 to 5000 and more preferably 200 to 1500.

The blend ratio between the acid anhydride group-containing oil or fat (A) and the curing agent (B) is preferably such that the molar ratio of the acid anhydride group in (A) to the functional group in (B) reactive with the acid anhydride group (acid anhydride group/functional group reactive with acid anhydride group) is in the range of 0.5 to 1.5 and more preferably in the range of 0.8 to 1.25. When the blend ratio between (A) and (B) is within the above-described range, a coating film with excellent adhesive strength can be obtained.

When the curing agent (B) contains a nitrogen-containing compound (B1), the amount of (B1) used is such that the molar ratio of nitrogen in (B1) to the acid anhydride group in (A) (nitrogen/acid anhydride group) is in the range of 0.05 to 0.7 and is more preferably in the range of 0.1 to 0.5. When the amount of (B1) used is within the above-described range, an adhesive cured product with excellent adhesive strength can be obtained while securing an appropriate potlife.

(Polycarbodiimide Compound (C))

The polycarbodiimide (C) reacts with the carboxylic acid generated as a result of the reaction between the acid anhydride group-containing oil or fat (A) and the curing agent (B), and thereby forms a more dense adhesive cured product and improves adhesive strength. Other examples of the compound that improves the crosslinking density by reacting with the carboxylic acid include polyazirine compounds and the like; however, the polycarbodiimide compound (C) is preferably used due to safety and the ease of controlling the reactivity.

The polycarbodiimide compound (C) used in the present invention is not particularly limited, and any known polycarbodiimide compound can be used.

The polycarbodiimide compound can be produced, for example, by heating an organic polyisocyanate in the presence of an appropriate catalyst and carrying out a decarboxylation reaction.

Examples of the organic polyisocyanate used as a synthesis raw material for the polycarbodiimide compound include aromatic polyisocyanates, aliphatic polyisocyanates, and alicyclic polyisocyanates. Specific examples include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl isocyanate, and 1,3,5-triisopropylbenzene-2,4-diisocyanate These may be used alone or in combination.

The above-described decarboxylation condensation reaction of the organic polyisocyanate proceeds in the presence of a carbodiimidizing catalyst, and examples of the carbodiimidizing catalyst that can be used include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers of these. Among these, from the reactivity aspect, 3-methyl-1-phenyl-2-phospholene-1-oxide is preferable.

The polycarbodiimide compound obtained from the organic polyisocyanate may have an isocyanate group at the terminal, and may have the degree of polymerization appropriately controlled by using a compound (capping agent) reactive with the isocyanate group.

Examples of the capping agent include monoisocyanates such as phenyl isocyanate, tolyl isocyanate, dimethylphenyl isocyanate, cyclohexyl isocyanate, butyl isocyanate, and naphthyl isocyanate.

Other examples of the capping agent that can be used include —OH group-containing aliphatic, aromatic, and alicyclic compounds such as methanol, ethanol, phenol, cyclohexanol, N-methylethanolamine, polyethylene glycol monomethyl ether, and polypropylene glycol monomethyl ether; =NH group-containing compounds such as diethylamine and dicyclohexylamine; —NH2 group-containing compounds such as butylamine and cyclohexylamine; —COOH group-containing compounds such as propionic acid, benzoic acid, and cyclohexanecarboxylic acid; —SH group-containing compounds such as ethyl mercaptan, allyl mercaptan, and thiophenol; and compounds containing an epoxy group and the like.

The molecular weight of the polycarbodiimide compound (C) in terms of number-average molecular weight is preferably in the range of 1000 to 5000 and more preferably in the range of 2000 to 4000.

The carbodiimide compounds described above can be obtained as commercially available products, and examples thereof include CARBODILITE V02B (solid component concentration: 100%, carbodiimide equivalent: 600), CARBODILITE V05 (solid component concentration: 100%, carbodiimide equivalent: 262), CARBODILITE V04PF (solid component concentration: 100%, carbodiimide equivalent: 336), CARBODILITE V05S (solid component concentration: 90 mass %, carbodiimide group equivalent: 291 (solid component equivalent: 262)), CARBODILITE V07 (solid component concentration: 50 mass %, carbodiimide group equivalent: 404 (solid component equivalent: 202), and CARBODILITE V09GB (solid component concentration: 70 mass %, carbodiimide group equivalent: 298 (solid component equivalent: 209) (all produced by Nisshinbo Chemical Inc.). Among these, V02B and V05 are preferably used since these have a strong effect of improving adhesive strength.

The carbodiimide-containing component may contain one or two or more of the carbodiimide compounds described above.

The amount of the polycarbodiimide compound (C) used is preferably such that the equivalent ratio (carbodiimide equivalent/acid anhydride group equivalent) of the carbodiimide group in the polycarbodiimide compound (C) to the acid anhydride group in the acid anhydride group-containing oil or fat (A) is in the range of 0.02 to 0.3 and more preferably in the range of 0.05 to 0.2.

When the amount of the polycarbodiimide compound (C) used is within this range, the adhesive strength improving effect can be exhibited by addition of the polycarbodiimide compound (C).

Specific examples of the preferable combination of the acid anhydride group-containing oil or fat (A) and the curing agent (B) are as follows:

1) A combination of maleic anhydride-modified tung oil serving as the oil or fat (A) and a polyester polyol and a tertiary amine-containing polyol serving as the curing agent (B)
2) A combination of maleic anhydride-modified soybean oil serving as the oil or fat (A) and a polyester polyol and a polyether polyamine serving as the curing agent (B)
3) A combination of maleic anhydride-modified tung oil serving as the oil or fat (A) and a polyester polyol, a polyether polyamine, and a tertiary amine-containing polyol serving as the curing agent (B)
4) A combination of any of 1) to 3) with an additional polycarbodiimide compound (C)

(Catalyst)

A catalyst may be added to the adhesive composition of the present invention. Examples of the catalyst that can be used include tertiary amine compounds, aliphatic cyclic amide compounds, and organic metal-based catalysts. Examples of the tertiary amine compounds include diazabicycloundecene, diazabicyclononene, triethylenediamine, 2-methyltriethylenediamine, quinuclidine, and 2-methylquinuclidine.

Examples of the aliphatic cyclic amide compounds include δ-valerolactam, ε-caprolactam, ω-enantholactam, η-caprylactam, and β-propiolactam.

Examples of the organic metal-based catalysts include dibutyltin oxide, dibutyltin diacetate, dibutyltin dilaurate, dioctyltin dilaurate, bismuth octylate, bismuth neodecanoate, zirconium octylate, and zirconium neodecanoate.

Among these, tertiary amine compounds are preferably used since the catalytic activity thereof is excellent.

(Solvent)

The adhesive composition of the present invention can be used as a solvent-type or solventless adhesive. In the present invention, the "solvent" of the adhesive refers to an organic solvent that has high solubility of polyisocyanate compounds and polyol compounds used in the present invention, and "solventless" refers to an adhesive that does not contain such an organic solvent having high solubility. Specific examples of the organic solvent having high solubility include toluene, xylene, methylene chloride, tetrahydrofuran, methanol, ethanol, isopropyl alcohol, methyl acetate, ethyl acetate, n-butyl acetate, acetone, methyl ethyl ketone (MEK), cyclohexanone, toluol, xylol, n-hexane, and cyclohexane. Among these, toluene, xylene, methylene chloride, tetrahydrofuran, methyl acetate, and ethyl acetate are known to be organic solvents having particularly high solubility.

Meanwhile, when low viscosity and the like are required, the adhesive of the present invention can be appropriately diluted with the aforementioned organic solvent having high solubility according to the desired viscosity. In such a case, one or both of the polyisocyanate composition (B) and the polyol composition (A) may be diluted. Specific examples of the organic solvent used in such cases include methanol, ethanol, isopropyl alcohol, methyl acetate, ethyl acetate, n-butyl acetate, acetone, methyl ethyl ketone (MEK), cyclohexanone, toluol, xylol, n-hexane, and cyclohexane. Among these, from the standpoint of solubility, ethyl acetate and methyl ethyl ketone (MEK) are preferable, and ethyl acetate is particularly preferable. The organic solvent is frequently used in an amount in the range of 20 to 50 mass % although this depends on the desired viscosity.

(Other Optional Components)

The adhesive composition of the present invention may additionally contain, if needed, a pigment. The pigment that can be used in this case is not particularly limited, and examples thereof include organic and inorganic pigments such as extender pigments, white pigments, black pigments, gray pigments, red pigments, brown pigments, green pigments, blue pigments, metal powder pigments, luminescent pigments, and pearlescent pigments, and plastic pigments listed in Handbook of Paint Raw Materials, 1970 edition (edited by Japan Paint Manufacturers Association). There are various specific examples for these coloring agents. For example, examples of the organic pigments include various insoluble azo pigments such as Benzidine Yellow, Hansa Yellow, and Lake Red 4R; soluble azo pigments such as Lake Red C, Carmine 6B, and Bordeaux 10; various (copper) phthalocyanine-based pigments such as phthalocyanine blue and phthalocyanine green; various chlorinated dyeing lakes such as rhodamine lake and methyl violet lake; various mordant dye pigments such as quinoline lake and fast sky blue; various vat dye pigments such as anthraquinone-based pigments, thioindigo-based pigments, and perinone-based pigments; various quinacridone-based pigments such as cinquasia red B; various dioxazine pigments such as dioxazine violet; various condensed azo pigments such as chromophthal; and aniline black.

Examples of the inorganic pigments include various chromates such as chrome yellow, zinc chromate, and molybdate orange; ferrocyan compounds such as Prussian blue; various metal oxides such as titanium oxide, Chinese flower, Mapico yellow, iron oxide, red iron oxide, chromium oxide green, and zirconium oxide; various sulfides and selenides such as cadmium yellow, cadmium red, and mercury sulfide; various sulfates such as barium sulfate and lead sulfate; various silicates such as calcium silicate and ultramarine blue; various carbonates such as calcium carbonate and magnesium carbonate; various phosphates such as cobalt violet and manganese violet; various metal powder pigments such as aluminum powder, gold powder, silver powder, copper powder, bronze powder, and brass powder; flake pigments and mica flake pigments of these metals; metallic pigments and pearl pigments such as mica flake pigments coated with metal oxides and mica-like iron oxide pigments; and graphite and carbon black.

Examples of the extender pigment include precipitated barium sulfate, whitewash, precipitated calcium carbonate, calcium bicarbonate, white marble, alumina white, silica, hydrated fine powder silica (white carbon), ultrafine anhydrous silica (aerosil), silica sand, talc, precipitated magnesium carbonate, bentonite, clay, kaolin, and ocher.

Examples of the plastic pigments include "GRANDOLL PP-1000" and "PP-2000S" produced by DIC Corporation.

As the pigments used in the present invention, inorganic oxides such as titanium oxide and Chinese white serving as white pigments, and carbon black serving as a black pigment are more preferable since they have excellent durability, weather resistance, and design properties.

The mass ratio of the pigments used in the present invention is preferably 1 to 400 parts by mass and in particular 10 to 300 parts by mass relative to a total of 100 parts by mass of the solid components in the adhesive composition of the present invention since bondability, blocking resistance, etc., are excellent.

(Adhesion Promoter)

Furthermore, the adhesive composition used in the present invention can be used in combination with an adhesion promoter. Examples of the adhesion promoter include coupling agents such as a silane coupling agent, a titanate-based coupling agent, and an aluminum-based coupling agent, and epoxy resins.

Examples of the silane coupling agent include amino silanes such as γ-aminopropyltriethoxysilane, γ-aminopropyltrimethoxysilane, N-β(aminoethyl)-γ-aminopropyltrimethoxysilane, N-β(aminoethyl)-γ-aminopropyltrimethyldimethoxysilane, and N-phenyl-γ-aminopropyltrimethoxysilane; epoxy silanes such as β-(3,4-epoxycyclohexyl)ethyltrimethoxysilane, γ-glycidoxypropyltrimethoxysilane, and γ-glycidoxypropyltriethoxysilane; vinyl silanes such as vinyltris(β-methoxyethoxy)silane, vinyltriethoxysilane, vinyltrimethoxysilane, and γ-methacryloxypropyltrimethoxysilane; and hexamethyldisilazane and γ-mercaptopropyltrimethoxysilane.

Examples of the titanate-based coupling agent include tetraisopropoxytitanium, tetra-n-butoxytitanium, butyl titanate dimer, tetrastearyl titanate, titanium acetylacetonate, titanium lactate, tetraoctylene glycol titanate, titanium lactate, and tetrastearoxytitanium.

An example of the aluminum-based coupling agent is acetoalkoxyaluminum diisopropylate.

Examples of the epoxy resin include various commercially available epoxidized oils and fats such as commercially available epoxidized soybean oil, various epoxy resins of epi-bis type, novolac type, β-methylepichlo type, cyclic oxirane type, glycidyl ether type, glycidyl ester type, polyglycol ether type, glycol ether type, epoxidized fatty acid ester type, polycarboxylic acid ester type, aminoglycidyl type, and resorcine type, and compounds such as triglycidyltris(2-hydroxyethyl) isocyanurate, neopentyl glycol diglycidyl ether, 1,6-hexanediol diglycidyl ether, acrylic glycidyl ether, 2-ethylhexyl glycidyl ether, phenyl glycidyl ether, phenol glycidyl ether, p-t-butylphenyl glycidyl ether, adipic acid diglycidyl ester, o-phthalic acid diglycidyl ester, glycidyl methacrylate, and butyl glycidyl ether. However, the amount thereof is preferably held to a minimum.

Examples of additives other than those described above include a leveling agent, inorganic fine particles such as colloidal silica and alumina sol, organic fine particles based on polymethyl methacrylate, a defoaming agent, an antisagging agent, a wetting and dispersing agent, a viscosity adjustor, a UV absorber, a metal deactivating agent, a peroxide decomposer, a flame retardant, a reinforcing agent, a plasticizer, a lubricant, a rust inhibitor, a fluorescent brightener, an inorganic heat ray absorber, a flameproofing agent, an antistatic agent, a dehydrating agent, a known common thermoplastic elastomer, a tackifier, a phosphate compound, a melamine resin, and a reactive elastomer. The amount of each of these additives may be appropriately adjusted within the range that does not impair the functions of the adhesive composition used in the present invention.

These additives can be used by being mixed with one of the acid anhydride group-containing oil or fat (A) and the curing agent (B), or can be blended as a third component during coating.

(Laminate)

The laminate of the present invention is obtained by bonding multiple films or sheets of paper with the adhesive of the present invention by a dry lamination method or a nonsolvent lamination method.

The films to be used are not particularly limited, and films appropriate for the usage can be selected. Examples of the films for food packaging include polyolefin films such as polyethylene terephthalate (PET) films, polystyrene films, polyamide films, polyacrylonitrile films, polyethylene films (LLDPE: low density polyethylene films, HDPE: high density polyethylene films) and polypropylene films (CPP: unstretched polypropylene films, OPP: biaxially stretched polypropylene films), polyvinyl alcohol films, and ethylene-vinyl alcohol copolymer films.

The films may have been subjected to a stretching process. According to a typical stretching process, a resin is melt-extruded by an extrusion film-forming method or the like so as to form a sheet, and the sheet is subjected to a simultaneous or sequential biaxial stretching process. In the case of sequential biaxial stretching, a longitudinal stretching process is typically performed first, followed by transversal stretching. Specifically, a method that combines longitudinal stretching that uses the difference in speed between rolls and transversal stretching that uses a tenter is frequently employed.

Alternatively, films obtained by laminating vapor-deposited layers of metals such as aluminum or metal oxides such as silica or alumina, and barrier films having gas barrier layers formed of polyvinyl alcohol, an ethylene-vinyl alcohol copolymer, vinylidene chloride, or the like, may also be used. When such films are used, a laminate having a barrier property against water vapor, oxygen, alcohol, inert gas, volatile organic matter (odor), etc., can be formed.

In order to form an adhesive layer that is free of film disruption or cissing, various surface treatments such as a flame treatment and a corona discharge treatment may be performed.

Alternatively, the laminate of the preset invention can be obtained by applying the adhesive of the present invention serving as an adhesive assisting agent (anchor coating agent) to a film with a laminator, performing a curing reaction, and then laminating a melted polymer material by using an extruder (extrusion lamination method). The aforementioned films used in the dry lamination method and the nonsolvent lamination method can be used as the film. The polymer material to be melted is preferably a polyolefin-based resin such as a low-density-polyethylene resin, a linear low-density-polyethylene resin, or an ethylene-vinyl acetate copolymer resin.

More specific examples of the structure of the laminate include the following:

(1) Substrate film 1/adhesive layer 1/sealant film
(2) Substrate film 1/adhesive layer 1/metal vapor-deposited unstretched film
(3) Substrate film 1/adhesive layer 1/metal vapor-deposited stretched film
(4) Transparent vapor-deposited stretched film 1/adhesive layer 1/sealant film
(5) Substrate film 1/adhesive layer 1/substrate film 2/adhesive layer 2/sealant film
(6) Substrate film 1/adhesive layer 1/metal vapor-deposited stretched film/adhesive layer 2/sealant film
(7) Substrate film 1/adhesive layer 1/transparent vapor-deposited stretched film/adhesive layer 2/sealant film
(8) Substrate film 1/adhesive layer 1/metal layer/adhesive layer 2/sealant film
(9) Substrate film 1/adhesive layer 1/substrate film 2/adhesive layer 2/metal layer/adhesive layer 3/sealant film
(10) Substrate film 1/adhesive layer 1/metal layer/adhesive layer 2/substrate film 2/adhesive layer 3/sealant film However, these examples are not limiting.

Examples of the substrate film 1 used in the structure (1) include OPP films, PET films, and nylon films.

Alternatively, the substrate film 1 may be coated so that the substrate film 1 exhibits the gas barrier property and improved ink-receiving properties in the case described below in which a printing layer is to be formed. Examples of the commercially available products of the substrate film 1 subjected to coating include K-OPP films and K-PET films. The adhesive layer 1 is a cured coating film of the adhesive of the present invention. Examples of the sealant film include CPP films and LLDPE films. A printing layer may be formed on the adhesive layer 1-side surface of the substrate film 1 (when the substrate film 1 is subjected to coating, the surface of the coating layer on the adhesive layer 1 side). The printing layer is formed by a typical printing method that has been used in printing on polymer films with various types of printing inks, such as gravure inks, flexo-inks, offset inks, stencil inks, and inkjet inks.

Examples of the substrate film 1 used in the structures (2) and (3) include OPP films and PET films. The adhesive layer 1 is a cured coating film of the adhesive of the present invention. As the metal vapor-deposited unstretched film, a VM-CPP film obtained by vapor-depositing a metal such as aluminum on a CPP film can be used, and, as the metal vapor-deposited stretched film, a VM-OPP film obtained by vapor-depositing a metal such as aluminum on an OPP film can be used. As with the structure (1), a printing layer may be formed on the adhesive layer 1-side surface of the substrate film 1.

Examples of the transparent vapor-deposited stretched film used in the structure (4) include OPP films, PET films, and nylon films subjected to silica or alumina vapor deposition. For the purpose of protecting the inorganic vapor-deposited layer of silica or alumina, a film with a coated vapor-deposited layer may be used. The adhesive layer 1 is a cured coating film of the adhesive of the present invention. Examples of the sealant film are the same as those for the structure (1). A printing layer may be formed on the adhesive layer 1-side surface of the transparent vapor-deposited stretched film (when the transparent vapor-deposited stretched film is subjected to coating on the inorganic vapor-deposited layer, the adhesive layer 1-side surface of the coating layer). The method for forming the printing layer is the same as for the structure (1).

Examples of the substrate film 1 used in the structure (5) include PET films. Examples of the substrate film 2 include nylon films. At least one of the adhesive layers 1 and 2 is a cured coating film of the adhesive of the present invention. Examples of the sealant film are the same as those for the structure (1). As with the structure (1), a printing layer may be formed on the adhesive layer 1-side surface of the substrate film 1.

Examples of the substrate film 1 in the structure (6) are the same as those for the structures (2) and (3). Examples of the metal vapor-deposited stretched film include VM-OPP films and VM-PET films obtained by vapor-depositing a metal such as aluminum on OPP films and PET films. At least one of the adhesive layers 1 and 2 is a cured coating film of the adhesive of the present invention. Examples of the sealant film are the same as those for the structure (1). As with the structure (1), a printing layer may be formed on the adhesive layer 1-side surface of the substrate film 1.

Examples of the substrate film 1 in the structure (7) include PET films. Examples of the transparent vapor-deposited stretched film are the same as those for the structure (4). At least one of the adhesive layers 1 and 2 is a cured coating film of the adhesive of the present invention. Examples of the sealant film are the same as those for the structure (1). As with the structure (1), a printing layer may be formed on the adhesive layer 1-side surface of the substrate film 1.

Examples of the substrate film 1 in the structure (8) include PET films. An example of the metal layer is an aluminum foil or the like. At least one of the adhesive layers 1 and 2 is a cured coating film of the adhesive of the present invention. Examples of the sealant film are the same as those for the structure (1). As with the structure (1), a printing layer may be formed on the adhesive layer 1-side surface of the substrate film 1.

Examples of the substrate film 1 in the structures (9) and (10) include PET films. Examples of the substrate film 2 include nylon films. An example of the metal layer is an aluminum foil or the like. At least one of the adhesive layers 1, 2, and 3 is a cured coating film of the adhesive of the present invention. Examples of the sealant film are the same as those for the structure (1). As with the structure (1), a printing layer may be formed on the adhesive layer 1-side surface of the substrate film 1.

When the laminate of the present invention includes at least one of a metal vapor-deposited film, a transparent vapor-deposited film, and a metal layer, the adhesive layer in contact with the metal vapor-deposited layer, the transparent vapor-deposited layer, and the metal layer is preferably a cured coating film of the adhesive of the present invention.

When the adhesive of the present invention is of a solvent type, the adhesive of the present invention is applied to a film material, which serves as a substrate, by using a roll such as a gravure roll and is heated in an oven or the like to evaporate the organic solvent, and then another substrate is bonded thereto to obtain a laminate of the present invention. After lamination, an aging treatment is preferably carried out. The aging temperature is preferably room temperature to 80° C., and the aging time is preferably 12 to 240 hours.

When the adhesive of the present invention is of a solventless type, the adhesive of the present invention heated to about 40° C. to 100° C. in advance is applied to a film material, which serves as a substrate, by using a roll such as a gravure roll, and then immediately another substrate is bonded thereto to obtain a laminate of the present invention. After lamination, an aging treatment is preferably carried out. The aging temperature is preferably room temperature to 70° C., and the aging time is preferably 6 to 240 hours.

When the adhesive of the present invention is used as an adhesive assisting agent, the adhesive assisting agent of the present invention is applied to a film material, which serves as a substrate, by using a roll such as a gravure roll and is heated in an oven or the like to evaporate the organic solvent, and then a melted polymer material is laminated thereto by an extruder so as to obtain a laminate of the present invention.

The coating amount of the adhesive is adjusted as appropriate. In the case of a solvent-borne adhesive, for example, the amount of the solid component is adjusted to 1 $g/m^2$ or more and 10 $g/m^2$ or less and more preferably 1 $g/m^2$ or more and 5 $g/m^2$ or less. In the case of a solventless-type adhesive, for example, the coating amount of the adhesive is, for example, 1 $g/m^2$ or more and 10 $g/m^2$ or less and preferably 1 $g/m^2$ or more and 5 $g/m^2$ or less.

When the adhesive of the present invention is used as the adhesive assisting agent, the coating amount is, for example, 0.03 $g/m^2$ or more and 0.09 $g/m^2$ or less (solid component).

The laminate of the present invention may include, in addition to any of the structures (1) to (10) described above, other films and substrates. Examples of other substrates that can be used include, in addition to the stretched films, unstretched films, and transparent vapor-deposited films described above, porous substrates formed of paper, wood, leather, and the like. The adhesive used in bonding these other substrates may be the adhesive of the present invention or any other adhesive.

As the paper, any known paper substrates can be used without any limitation. Specifically, paper is manufactured by using a known paper machine and papermaking natural fibers such as wood pulp; however, the papermaking conditions are not particularly specified. Examples of the papermaking natural fibers include wood pulp such as softwood pulp and hardwood pulp, non-wood pulp such as manila hemp pulp, sisal pulp, and flax pulp, and pulp obtained by chemically modifying these pulp materials. The types of the pulp that can be used include chemical pulp, ground pulp, chemiground pulp, and thermomechanical pulp obtained by a sulfate cooking method, an acidic, neutral, alkaline sulfite cooking method, a soda salt cooking method, etc.

Moreover, various commercially available high-quality paper, coated paper, backing paper, impregnated paper, cardboard paper, paperboard, and the like can be used. If needed, a printing layer may be disposed on the outer surface or inner surface side of the paper layer.

The "other layers" may each contain a known additive or stabilizer, for example, an antistatic agent, an easily adhesive coating agent, a plasticizer, a lubricant, or an antioxidant. Moreover, the "other layers" may each be subjected to a preliminary surface treatment, such as a corona treatment, a plasma treatment, an ozone treatment, a chemical treatment, or a solvent treatment, in order to improve adhesion with other materials to be laminated.

The laminate of the present invention is suitable for use in various applications, for example, packaging materials for food, pharmaceutical products, and daily supplies, paper tableware such as lid materials, paper straws, paper napkins, paper spoons, paper plates, and paper cups, outdoor industrial usages such as barricade materials, roofing materials, solar battery panel materials, battery packaging materials, window materials, exterior flooring materials, illumination protection materials, automobile members, sign boards, and stickers, decorative sheets used in a simultaneous injection molding and decorating method or the like, and packaging materials for laundry liquid detergents, kitchen liquid detergents, bath liquid detergents, bath liquid soaps, liquid shampoos, and liquid conditioners.

<Packaging Material>

The laminate of the present invention can be used as a multilayer packaging material for protecting food, pharmaceutical products, etc. For the multilayer packaging material usage, the layer structure can vary depending on the contents, and the environment and form in which the material is used. In addition, the package of the present invention may be subjected to an easy open treatment or be provided with an appropriate resealing means.

The packaging material of the present invention is obtained by using laminates of the present invention, that is, after the laminates are placed on top of each other with the sealant film surfaces facing each other, the peripheral end portions thereof are heat-sealed to form a bag. Examples of the method for making the bag include folding the laminate of the present invention or placing the laminates of the present invention on top of each other so that the inner layer surfaces (sealant film surfaces) face each other, and then heat-sealing the peripheral end portions in a manner of a side surface sealing type, a two-side seal type, a three-side seal type, a four-side seal type, an envelope bonding seal type, a butt-seam seal type, a pleated seal type, a flat bottom seal type, a rectangular bottom seal type, a gazette type, or other heat seal type. The packaging material of the present invention can take various forms depending on the contents, and the environment and the form in which the material is used. A self-supporting packaging material (standing pouch) or the like can also be formed. The heat sealing method may be any known method such as bar sealing, rotary roll sealing, belt sealing, impulse sealing, high frequency sealing, or ultrasonic sealing.

The packaging material of the present invention may be filled with the contents from its opening portion and then the opening portion is heat-sealed so as to manufacture a product that uses the packaging material of the present invention. Examples of the food to be contained include snacks such as rice snacks, bean snacks, nuts, biscuits, cookies, wafers, marshmallows, pies, half-baked cakes, candies, and confectionaries; staples such as bread, snack noodles, instant noodles, dried noodles, pastas, aseptic packed rice, porridge, rice porridge, packed rice cake, and cereal foods, agricultural products such as pickles, boiled beans, natto, miso, frozen tofu, tofu, nametake mushrooms, konjac, processed wild vegetables, jams, peanut cream, salads, frozen vegetables, and processed potatoes, processed meat products such as hams, bacons, sausages, chicken processed products, and corned beef, processed seafood products such as fish ham and sausages, seafood paste products, kamaboko, seaweed sheets, soy sauce-boiled food, dried bonito, salted fish guts, smoked salmon, and spicy seasoned cod roe, fruits such as peaches, tangerines, pineapples, apples, pears, and cherries, vegetables such as corn, asparaguses, mushrooms, onions, carrots, radishes, and potatoes, prepared food such as frozen deli and chilled deli such as hamburger patties, meatballs, fried fish, dumplings, and croquettes, dairy products such as butter, margarine, cheese, cream, instant creamy powder, and modified milk powder for babies, and liquid condiments, curry in boilable films, and pet food.

For non-food products, the packaging material can be used as various packaging materials for cigarettes, disposable body warmer, pharmaceutical products such as transfusion packs, laundry liquid detergent, kitchen liquid detergent, bath liquid detergent, bath liquid soaps, liquid shampoos, liquid conditioners, cosmetics such as lotions and creams, vacuum insulation materials, batteries, and the like.

EXAMPLES

The contents and effects of the present invention will now be described in further detail through the examples below. In the examples, "parts" means "parts by mass".

Production Example 1

Synthesis of Acid Anhydride Group-Containing Oil or Fat (A-1)

Into a flask equipped with a stirrer, a thermometer, and a nitrogen gas inlet tube, 1000 parts of tung oil was charged and heated to 100° C. Next, 270 parts of maleic anhydride was added in five portions, and the reaction was carried out for 3 more hours to obtain an acid anhydride group-containing oil or fat (A-1).

Production Example 2

Synthesis of Acid Anhydride Group-Containing Oil or Fat (A-2)

Into a flask equipped with a stirrer, a thermometer, and a nitrogen gas inlet tube, 1000 parts of linseed oil and 100 parts of maleic anhydride were charged and heated to 180° C. After carrying out the reaction at 180° C. for 2 hours, 125 parts of maleic anhydride was added, the temperature was increased to 200° C., and the reaction was carried out for 3 more hours to obtain an acid anhydride group-containing oil or fat (A-2).

Production Example 3

Synthesis of Acid Anhydride Group-Containing Oil or Fat (A-3)

Into a flask equipped with a stirrer, a thermometer, and a nitrogen gas inlet tube, 800 parts of soybean oil, 225 parts of maleic anhydride, and 0.5 parts of phosphoric acid were charged and heated to 180° C. After carrying out the reaction at 180° C. for 3 hours, the temperature was decreased to 100° C., 200 parts of tung oil was further added, and the reaction was carried out for 3 more hours to obtain an acid anhydride group-containing oil or fat (A-3).

Production Example 4

Synthesis of Polyester Polyol (B-1)

Into a polyester reactor equipped with a stirrer, a thermometer, a nitrogen gas inlet tube, a rectification column, a water separator, and the like, 220 parts of diethylene glycol, 344 parts of neopentyl glycol, 286 parts of adipic acid, 287 parts of isophthalic acid, and 0.1 parts of tetraisopropyl titanate were charged, the temperature was gradually increased such that the rectification column top temperature did not exceed 100° C., and the inner temperature was retained at 240° C. The esterification reaction was terminated when the acid value reached 2.0 (mg-KOH/g) or less, and a polyester polyol (B-1) was obtained. The hydroxyl value was 180 (mg-KOH/g).

Production Example 5

Synthesis of Polyester Polyol (B-2)

A polyester polyol (B-2) was obtained as in Production Example 4 except that the raw materials to be used were changed to 127 parts of ethylene glycol, 240 parts of diethylene glycol, 153 parts of neopentyl glycol, and 642 parts of adipic acid. The hydroxyl value was 150 (mg-KOH/g).

Production Example 6

Synthesis of Polyester Polyol (B-3)

A polyester polyol (B-3) was obtained as in Production Example 4 except that the raw materials to be used were changed to 52 parts of ethylene glycol, 447 parts of diethylene glycol, 45 parts of glycerin, and 607 parts of adipic acid. The hydroxyl value was 180 (mg-KOH/g).

Production Example 7

Synthesis of Polyisocyanate Compound (D)

In to a flask equipped with a stirrer, a thermometer, and an nitrogen gas inlet tube, 50 parts of Lupranate MI (a 50/50 mixture of 4,4'-diphenylmethane isocyanate/2,4-diphenylmethane diisocyanate produced by BASF INOAC Polyurethanes Ltd.) was charged, and the temperature was increased to 60° C. Thereto, 50 parts of a 20/30 (weight ratio) mixture polypropylene glycol having a molecular weight of 1000/ polypropylene glycol having a molecular weight of 2000 was added gradually in four fractions, the temperature was then further increased to 80° C., and carrying out the reaction for five more hours to obtain a polyisocyanate compound (D). The NCO % of the obtained polyisocyanate compound (D) was 13.8%.

Examples (Examples 1 to 5 and Comparative Example)

According to the formulations described in Tables 1 and 2, the acid anhydride group-containing oil or fat (A) and the curing agent (B) were blended to prepare each adhesive composition, and various types of evaluation were conducted.

(Appearance Evaluation)

Each of the adhesive compositions containing the main agents and curing agents was applied to a polyethylene terephthalate film (hereinafter referred to as a "PET film") totally covered with gravure-printed printing ink ("FINART R794 white" produced by DIC Corporation) so that the coating amount of the adhesive composition in terms of solid content was about 1.8 g/m$^2$ by using a laminator having a lamination speed set to 250 m/minute, and the film was bonded with an aluminum vapor-deposited unstretched polypropylene (hereinafter referred to as a "VMCPP film") so as to prepare a laminate film. After four days of aging at 50° C., the appearance of the white ink portion in the 10 m roll outer portion (the surface state of the film) was evaluated according to the following standard. 5: Excellent≤↔1: Poor)

5: No bubbles occurred, and the surface was flat and smooth.

4: Few fine bubbles occurred.

3: Fine bubbles occurred throughout the film surface.

2: Fine bubbles and large bubbles occurred throughout the film surface.

1: Many large bubbles occurred throughout the film surface.

(Adhesive Strength)

A 15 mm-width test piece was prepared from the PET/ VMCPP film used in the appearance evaluation of the laminate film, and the T-peel strength was measured at 25° C. at a peeling rate of 300 mm/min.

(Heat Seal Strength)

Each of the adhesive compositions containing the main agents and curing agents was applied to a biaxially stretched nylon ("EMBLEM" 15 μm produced by UNITIKA LTD., hereinafter referred to as a "ONy film") so that the coating amount in terms of solid content was about 1.8 g/m$^2$ by using a laminator having a lamination speed set to 250 m/minute, and the film was bonded with a linear low-density polyethylene ("MX-HC" 60 μm produced by Tohcello, hereinafter referred to as a "LLDPE film") so as to prepare a laminate film.

After four days of aging at 50° C., each of the laminate films was heat-sealed with a heat sealer at 180° C.×1 second, 0.1 MPa, and a width of 10 mm, then a test piece having a 15 mm width was cut out, and the T-peel strength was measured at 25° C. at a peeling rate of 300 mm/min.

The results are indicated in Tables 1 and 2.

TABLE 1

|  |  |  | Example 1 | Example 2 | Example 3 | Example 4 | Example 5 |
|---|---|---|---|---|---|---|---|
| Acid anhydride group-containing oil or fat (A) |  | A-1 | 100 |  |  | 100 |  |
|  |  | A-2 |  | 100 |  |  |  |
|  |  | A-3 |  |  | 100 |  | 100 |
| Curing agent (B) | Hydroxyl group-containing compound (B0) | B-1 | 33.53 |  |  | 33.53 |  |
|  | Hydroxyl group-containing compound (B0) | B-2 |  |  | 20 |  | 20 |
|  | Hydroxyl group-containing compound (B0) | B-3 |  | 25 |  |  |  |
|  | Hydroxyl group-containing compound (B0) | Gly |  |  | 3 |  | 3 |
|  | Amine compound (B1) | T-403 |  | 6 | 10 |  | 10 |
|  | Tertiary amine-containing polyol (B2) | EDP-450 | 12.24 | 10 |  | 12.24 |  |
| Polycarbodiimide compound (C) |  | V-02B |  |  |  |  | 8 |
|  |  | V-05 |  |  |  | 8 |  |
| (A)/(B) |  |  | 1.00 | 0.89 | 0.85 | 1.00 | 0.85 |
| N/(A) |  |  | 0.25 | 0.46 | 0.36 | 0.25 | 0.36 |
| (C)/(A) |  |  | — | — | — | 0.14 | 0.07 |
| Evaluation results | Appearance |  | 5 | 5 | 5 | 5 | 5 |
|  | Adhesive strength |  | 1.6 | 1.4 | 1.4 | 2.5 | 2 |
|  | Heat seal strength |  | 48 | 46 | 47 | 60 | 57 |

TABLE 2

|  |  |  | Comparative Example 1 |
|---|---|---|---|
| Polyisocyanate compound (D) |  | D | 100 |
| Curing agent (B) | Hydroxyl group-containing compound (B0) | B-3 | 60 |
| Evaluation results | Appearance |  | 2 |
|  | Adhesive strength |  | 1.5 |
|  | Heat seal strength |  | 50 |

In Tables 1 and 2, abbreviations are as follows.
Gly: glycerin
T-403: JEFFAMINE T-403 (trifunctional polyether polyamine produced by Huntsman Corporation (USA), molecular weight: 440)
EDP-450: Adeka Polyether EDP-450 (polypropylene glycol containing two tertiary amines in a molecule, produced by Adeka Corporation, molecular weight: 450, OHV: 500)
V-02B: Carbodiimide V-02B (produced by Nisshinbo Chemical Inc., carbodiimide equivalent: 262)
V-05: Carbodiimide V-05 (polycarbodiimide compound produced by Nisshinbo Chemical Inc., carbodiimide equivalent: 600)
(A)/(B): equivalent ratio of acid anhydride group in the acid anhydride group-containing oil or fat (A) to the functional group in the curing agent (B) that reacts with the acid anhydride group
N/(A): equivalent ratio of nitrogen in the amine compound (B1) to the acid anhydride group in the acid anhydride group-containing oil or fat (A)
(C)/(A): equivalent ratio of the carbodiimide group in the polycarbodiimide compound (C) to the acid anhydride group contained in the acid anhydride group-containing oil or fat (A)

As a result, Examples 1 to 5 had required adhesive strength and heat seal strength as well as particularly excellent appearance. In contrast, Comparative Example had poor appearance.

What is claimed is:
1. A two-part adhesive composition comprising:
a maleic anhydride-modified vegetable oil (A1); and
a curing agent (B) separately stored from the maleic anhydride-modified vegetable oil (A1) until the curing agent (B) is mixed with the maleic anhydride-modified vegetable oil (A1), the curing agent (B) having a reactive group reactive with the acid anhydride group, the curing agent (B) comprising:
a polyol (B0), and
an amine compound (B1), wherein the amine compound (B1) comprises a tertiary amine-containing polyol (B2).
2. A laminate obtained by placing an adhesive layer between a first substrate and a second substrate, wherein the adhesive layer comprises the adhesive composition according to claim 1.
3. A package obtained by forming a bag from a laminate obtained by placing an adhesive layer between a first substrate and a second substrate, wherein the adhesive layer comprises the adhesive composition according to claim 1.
4. A two-part adhesive composition comprising:
a polycarbodiimide compound (C);
a maleic anhydride-modified vegetable oil (A1), and
a curing agent (B) separately stored from the maleic anhydride-modified vegetable oil (A1) until the cur- ing agent (B) is mixed with the maleic anhydride-modified vegetable oil (A1), the curing agent (B) having a reactive group reactive with the acid anhydride group, the curing agent (B) comprising:
a polyol (B0), and
an amine compound (B1) wherein the polycarbodiimide compound (C) is present either in the maleic anhydride-modified vegetable oil (A1) or the curing agent (B).

5. A laminate obtained by placing an adhesive layer between a first substrate and a second substrate, wherein the adhesive layer comprises the adhesive composition according to claim 4.

6. A package obtained by forming a bag from a laminate obtained by placing an adhesive layer between a first substrate and a second substrate, wherein the adhesive layer comprises the adhesive composition according to claim 4.

7. A two-part adhesive composition comprising:
a maleic anhydride-modified vegetable oil (A1), and
a curing agent (B) separately stored from the maleic anhydride-modified vegetable oil (A1) until the curing agent (B) is mixed with the maleic anhydride-modified vegetable oil (A1), the curing agent (B) having a reactive group reactive with the acid anhydride group, the curing agent (B) comprising:
a polyol (B0), and
an amine compound (B1), wherein the amine compound (B1) comprises a polyether polyamine.

8. A laminate obtained by placing an adhesive layer between a first substrate and a second substrate, wherein the adhesive layer comprises the adhesive composition according to claim 7.

9. A package obtained by forming a bag from a laminate obtained by placing an adhesive layer between a first substrate and a second substrate, wherein the adhesive layer comprises the adhesive composition according to claim 7.

10. A two-part adhesive composition comprising:
a maleic anhydride-modified vegetable oil (A1), and
a curing agent (B) separately stored from the maleic anhydride-modified vegetable oil (A1) until the curing agent (B) is mixed with the maleic anhydride-modified vegetable oil (A1), the curing agent (B) having a reactive group reactive with the acid anhydride group, the curing agent (B) comprising:
a polyol (B0), and
an amine compound (B1), wherein the amine compound (B1) comprises a tertiary amine-containing polyol (B2) and a polyether polyamine.

11. A laminate obtained by placing an adhesive layer between a first substrate and a second substrate, wherein the adhesive layer comprises the adhesive composition according to claim 10.

12. A package obtained by forming a bag from a laminate obtained by placing an adhesive layer between a first substrate and a second substrate, wherein the adhesive layer comprises the adhesive composition according to claim 10.

* * * * *